Sept. 21, 1965 H. G. DE HART 3,207,618
METHOD AND APPARATUS FOR APPLYING PROTECTIVE COATINGS
Filed Aug. 3, 1961 2 Sheets-Sheet 1
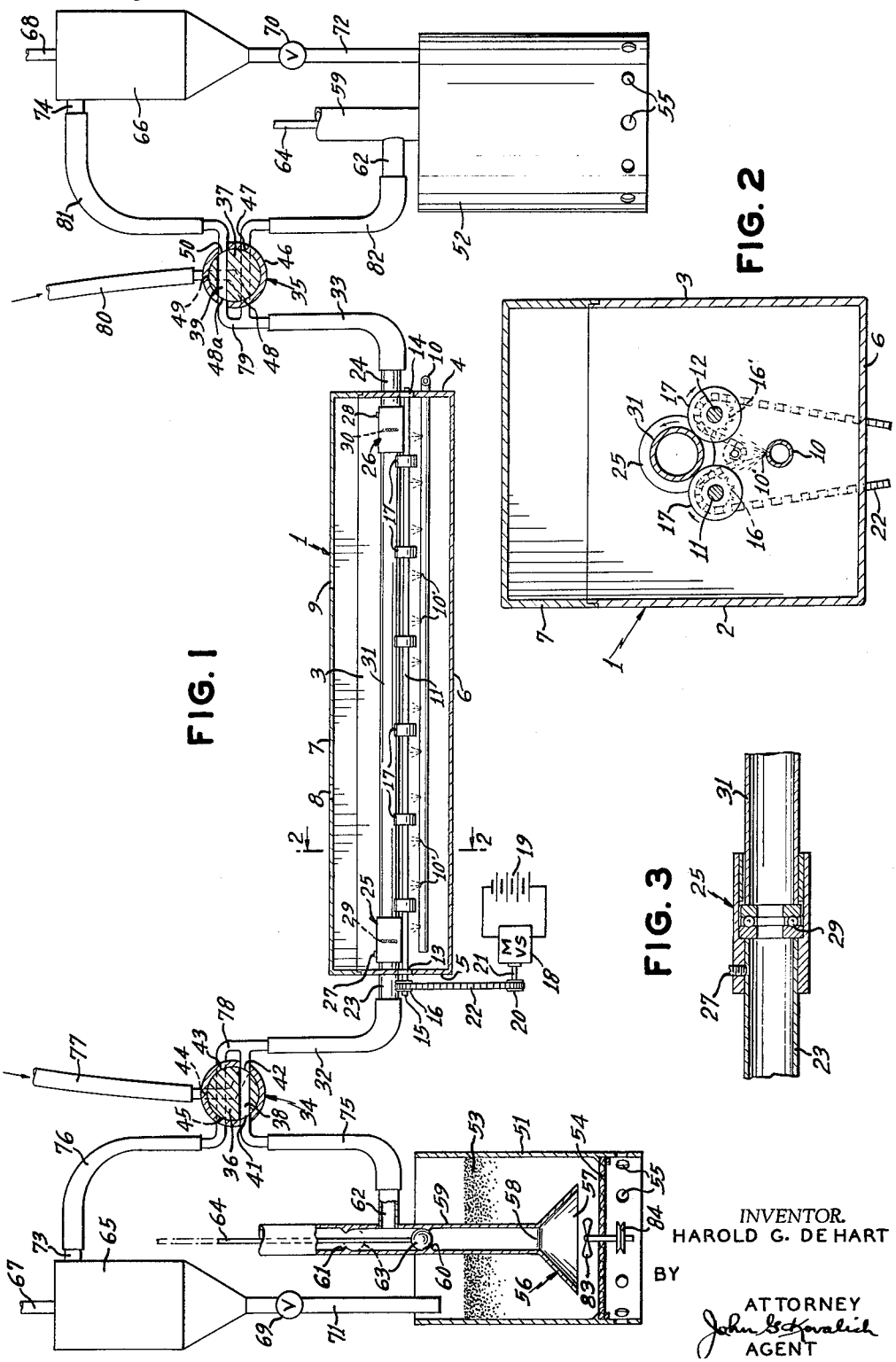
INVENTOR.
HAROLD G. DE HART
BY
ATTORNEY
AGENT Sept. 21, 1965    H. G. DE HART    3,207,618
METHOD AND APPARATUS FOR APPLYING PROTECTIVE COATINGS
Filed Aug. 3, 1961    2 Sheets-Sheet 2
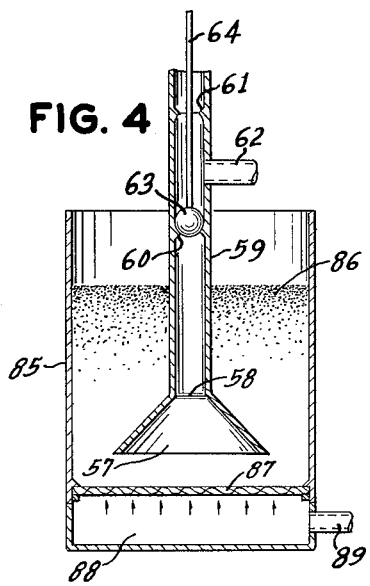
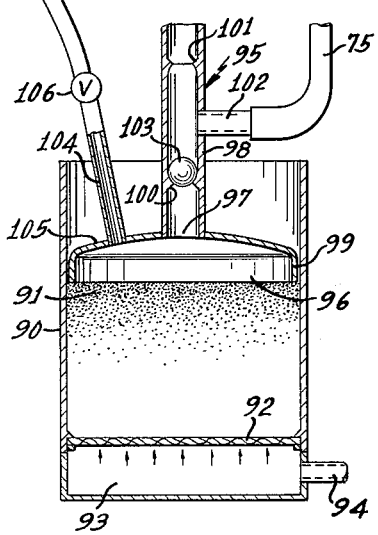
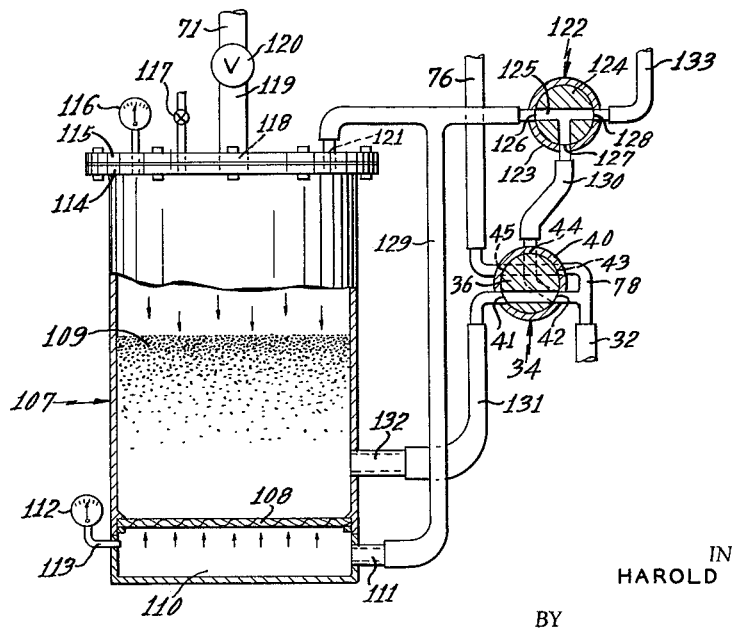
INVENTOR.
HAROLD G. DEHART
BY
John G. Kovalick
ATTORNEY
AGENT United States Patent Office 3,207,618
Patented Sept. 21, 1965

3,207,618
METHOD AND APPARATUS FOR APPLYING PROTECTIVE COATINGS
Harold George De Hart, Clifton, N.J., assignor, by mesne assignments, to International Protected Metals, Inc., a corporation of New Jersey
Filed Aug. 3, 1961, Ser. No. 128,993
12 Claims. (Cl. 117—18)

The present invention deals with a method and apparatus for applying protective coatings and, more particularly, with a method and apparatus for applying particles of plastic materials to heated articles and fusing the particles to form a plastic coating on the articles.

In the art of applying plastic coatings to articles, several different coating methods are known including the method of spraying liquid plastic material onto the articles, the method of spraying pulverised or powdered plastic material onto a headed object, the method of passing a circulatory stream of plastic particles into contact with a heated article, and the method of contacting the article to be coated, while in a heated state, by immersing the article in a fluidized bed of plastic particles. It is also known to line metal pipes by passing plastic particles entrained in a gas stream through a vertically mounted heated pipe wherein plastic particles are fused to the heated pipe on contact to form a fused plastic lining. It is still further known to line pipes with a plastic layer by forming a fluidized bed of plastic particles in a container, substantially as described in U.S. Patent No. 2,844,489, and then otherwise increasing the pressure of the fluidizing gas to elevate the fluidized particles into contact with the interior surface of a heated pipe mounted above the container, whereby the particles which contact the pipe are fused to form a protective plastic lining.

The above-mentioned methods, especially those relating to the lining of pipes, have the disadvantage that such methods do not produce a pore-free coating or lining, nor is the coating or lining characterized by a desirably smooth and uniform surface.

The present invention relates to a method and apparatus for applying protective plastics, coatings on articles such as I-beams, girders, cylinders, and linings on pipes and tubes, by applying particles of thermoplastic resins, thermosetting resins, vitreous materials, enamels, etc., to the heated articles and which particles are subsequently fused thereon.

The apparatus comprises preferably a plurality of containers each containing a bed of plastic particles, means for withdrawing particles from the bed of particles, means for selectively passing the withdrawn particles through a rotating heated pipe or tube wherein particles are fused to the pipe or tube as a lining thereon, or as a coating on articles contained by a pipe or tube, and means for selectively passing the unfused particles to a separator means communicating with at least one of the particle containers.

The method of the invention comprises forming a bed of plastic particles in a container, withdrawing particles from the bed by a fluid motivating means, initially passing the particles through a heated rotating pipe or tube and into a separator means at high velocity, decreasing or arresting the velocity of motivating means when at least the pipe or tube is substantially filled with the plastic particles, increasing the speed of rotation of the pipe or tube until a substantial layer or lining of fused plastic is formed on the article, selectively withdrawing the unfused particles from the pipe or tube under increased velocity through the separator means, and returning the unfused particles to the container.

It is an object of the invention to provide a method and apparatus for easily and economically coating heated articles with a layer of plastic material.

It is another object of the invention to provide a method and apparatus for coating heated articles or lining heated pipes or tubes with a plastic layer by passing plastic particles into and through a rotating pipe or tube under selective velocities and rotating the pipe or tube with variable rotatable speeds during the coating operation.

It is a further object of the invention to provide a method and apparatus for lining pipes or tubes with a dense plastic lining substantially free of gas bubbles.

It is a still further object of the invention to provide a plastic lining on pipes or tubes by passing plastic particles into a substantially horizontally positioned heated and rotating tube or pipe.

Other objects and advantages of the invention will become apparent from the description hereinafter following and the drawings forming a part hereof, in which:

FIGURE 1 illustrates a partly elevational and partly cross-sectional view of an apparatus according to the invention, FIGURE 2 illustrates a cross-sectional view along lines 2—2 of FIGURE 1, FIGURE 3 illustrates an enlarged partly cross-sectional and partly elevational view of a component of FIGURE 1, FIGURE 4 illustrates a cross-sectional view of a modification of the invention, FIGURE 5 illustrates a cross-sectional view of another modification of the invention, and FIGURE 6 illustrates a partly cross-sectional and partly elevational view of a further modification of the invention.

In accordance with FIGURES 1 and 2, the apparatus of the invention comprises an elongated oven 1 having side walls 2 and 3, end walls 4 and 5, bottom wall 6, and a cover 7 enclosing the top of the oven. The cover 7 is provided with vents 8 and 9. An elongated fuel conduit 10 is mounted longitudinally of the oven above the bottom wall and passes outwardly of the oven through end wall 4.

The conduit is provided with longitudinally spaced apertures 10′ through which fuel gases pass and which, upon ignition, provides for the oven heat. The oven heating means illustrated is purely exemplary since other appropriate equivalent heating means may be employed. A pair of laterally-spaced rotatable rods or shafts 11 and 12 are mounted above the heating conduit 10 and bridge the end walls 4 and 5. End portions of the rotatable rods are each rotatably mounted in bearings 13 and 14 in the end walls 4 and 5. At least one end portion of each of the shafts, as illustrated by end portion 15, extends outwardly of an end wall, e.g. end wall 5, and sprocket means 16 and 16′ are mounted on the extended portions. Each shaft 11 and 12 is provided with axially spaced rollers 17. A variable speed electric motor 18, energized by a source of electrical energy 19, is positioned below the oven 1. A sprocket means 20 is mounted on motor shaft 21, and a chain drive 22 engages the sprockets 16, 16′ and 20, whereby the shafts 11 and 12 are rotated in a common direction. At least a pair of conduits, e.g. conduits 23 and 24, are preferably fixedly mounted each through an end wall 5 and 4, respectively, in axially-spaced alignment with each other. Couplings 25 and 26 are each mounted on an end of each conduit 23 and 24, respectively, inside the oven 1, the couplings being secured to the conduits by securing means 27 and 28. Thrust bearing means 29 and 30 as particularly illustrated by FIGURE 3, are each positioned internally of and intermediate the ends of each coupling. A pipe or tube 31 is mounted inside the oven 1 with the ends thereof rotatably seated inside the couplings 25 and 26 and in abutment with the bearings 29 and 30. Preferably, the ends of the conduits 23 and 24 are also in abutment with the bearings 29 and 30, as illustrated. The pipe 31 is seated on the cradle formed by the spaced rollers 17 and is rotatable thereon when the shafts 11 and 12 are activated. Conduits, preferably flexible conduits 32 and 33, are connected to the ends of the conduits 23 and 24 and to valve means 34 and 35, respectively. The valves each comprise a rotatable core 36 and 37 having eccentric bores 38 and 39 formed therethrough. The housing 40 of valve 34 has ports 41, 42, 43, 44 and 45 formed therethrough. The housing 46 of valve 35 has ports 47, 48, 48a, 49 and 50 formed therethrough. Any other suitable and functionally equivalent valve means may be substituted for the valves particularly illustrated and described.

Identical containers 51 and 52, each containing a bed of plastic particles e.g. a powder bed 53, are positioned preferably with the oven 1 therebetween. The bed 53 is composed of thermoplastic powders such as powders of polyethylene, polypropylene, nylon, fluorocarbons, a vinyl or a cellulosic material, etc., or thermosetting powders such as powders of epoxy resins, polyesters, phenolics, etc., or mixtures of such powders. Any other type of plastic material in the form of particles may be employed as the powder bed, e.g. powdered enamels, porcelain, glass, etc.

A porous or gas pervious filter or support 54 composed, e.g., of woven or non-woven fabric, or a porous metal disc, or a perforated disc such as described in application Serial No. 86,657, filed February 2, 1961, now Patent No. 3,099,493, is suitably supported within the containers as a support for the powder bed and is located across the cross section of the container at a position above the open bottom of the container. A plurality of spaced apertures 55 are formed through the walls of the containers at locations below the filter 54 to permit the free access of air to the area below the filter. In containers of the type illustrated, the powder bed 53 is a substantially normally inert bed and requires no particular aeration, gas activation or conditioning prior to coating operation hereinafter more particularly described. A funnel member 56 having a wide opening 57 and smaller opening 58 with an elongated tube 59 extending axially from the smaller opening is inserted into the bed 53 with the wide opening facing the filter 54. Preferably, the tube 59 extends upwardly and outwardly of the container. Vertically spaced abutment means or collars 60 and 61 are formed on the inner wall of the tube 59. A tubular passage means 62 communicates through the wall of the tube 59 between the collars 60 and 61 and is vertically movable therebetween and selectively seatable against the collars by means of a vertical rod 64 connected to the ball and passing upwardly through the tube 59.

Identical well known cyclone type separators 65 and 66 are positioned above the respective containers 51 and 52. Each separator is provided with a conduit 67 and 68, connectable to a source of vacuum. A valve 69 and 70 is provided at the bottom of each separator and is connected to a tube 71 and 72 directed into a container 51 and 52. A tubular passage means 73 and 74 communicates tangentially through the top portion of the wall of each separator 65 and 66. A tube 75 is connected to the tube 62 and port 41 of valve 34. A tube 76 is connected to the tube 73 and port 45 of valve 34. Auxiliary tube 77 is connected to port 44 of valve 34. Ports 42 and 43 are connected to conduit 32 through a branched tube 78. A branched tube 79 communicating with ports 48 and 48a of valve 35 is connected to conduit 33. Auxiliary tube 80 is connected to port 49. Tube 81 is connected between port 50 and tubular passage 74, and tube 82 is connected to port 47 and passage means 62 of tube 59 in container 52.

Each container 51 and 52 is advantageously provided with an agitator 83 in bed 53 between the funnel mouth 57 and filter 54. The agitator is mounted on a vertical shaft passing through the filter 54 and a drive means 84, e.g. a pulley, is mounted on an end of the shaft below the filter.

In operation, at least one of the containers 51 and 52, e.g., container 51, is provided with a substantially inert bed of plastic particles 53 having a depth sufficient to extend a substantial distance above the large opening 57 of funnel 59. Oven 1 is heated by means of the heating means 10 and pipe 31 is seated on the cradle within the oven as described above. Pipe 31 is then heated to a desirable temperature at which the particular plastic powder material in 51 will fuse to the heated pipe. The variable speed motor 18 is activated and pipe 31 rotates on rollers 17. The speed of rotation of pipe 31 is adjusted to a predetermined optimum rotation for the uniform fusing of the plastic particles to the internal surface thereof. Suction is applied to vacuum conduit 68 of separator 66 from a source of vacuum (not shown). Ball valve 63, associated with the funnel 59 in container 51, is raised from its seat or collar 60 by means of rod 64 to engage seat or collar 61. Valve 35 is operated to position the valve bore 39 in communication with ports 48a and 50. The valve 34 is then operated to position the valve bore 38 in communication with ports 41 and 42, whereby, due to the suction applied to conduit 68, plastic particles from bed 53 will flow at high velocity upwardly through funnel 59, through passage 62, valve 34, tube 32, pipe 31, tube 33, valve 35, tube 81, and into separator 66. The pipe 31 is substantially instantaneously filled by the vacuum motivation of the powder and the applied suction is almost immediately mechanically selectively reduced, whereby the velocity of the powder passing through pipe 31 is also correspondingly reduced to such optimum velocity at which the plastic particles will desirably fuse to the hot pipe walls. The fusing operation takes only a few seconds. Thereupon, the rotational speed is again increased preferably to a speed greater than about 100 lineal feet per minute, whereby sufficient centrifugal force is applied to the fused layer to preclude the formation of or to remove entrapped air or gas therein. If the pipe is not rotated during the coating operation, some entrained air or gas is trapped in the fused lining and eventually results in pinholes in the finished lining unless the plastic is heated for extended periods which cuts efficiency of the process. Otherwise, elutriation of the plastic particles occurs resulting in an uneven coating. Rotating the heated pipe at a sufficiently high speed to impart effective centrifugal forces to the fused layer results in a compact coating free of gas bubbles.

In order to assure that the powder in container 51 will flow uniformly through the system, the bed 53 between the filter 54 and funnel mouth 57 is agitated, for example, by an agitator 83 motivated by a belt drive means or pulley 84 located below the filter.

After the hot pipe has been subjected to the above-described coating conditions for a time of several seconds, depending empirically on the thickness of the coating desired, the ball valve 63 is moved into engagement with the lower seat or collar 60 and passage of the powder through tube 59 is arrested. Simultaneously or subsequently to the seating of the ball on the lower collar, the suction through the system is again increased to cause a high velocity flow of air or gas to flow into the upper portion of tube 59 above the seated ball, through tube 62 and through the system exactly in the path of the powder previously moved through the system. By means of the high velocity air or gas the pipe 31 is purged of the unfused powder in a scouring action and, after a brief purging and scouring treatment, the vacuum is terminated, the pipe, now substantially empty of unfused powder, is maintained for a brief period under the increased rotational speed in an after-treatment whereby any unfused powder adhering to the lining is completely fused and any unevenness of the plastic layer is smoothened to provide a smooth-bore lining.

It is apparent that the unfused powder which has passed through the system now resides in the bottom of cyclone separator 66. Valve 70 of separator 66 is opened and the powder falls into container 52.

When the coating operation hereinbefore described is completed, the motor 18 is deactivated, the rotation of pipe 31 is stopped, the valves 34 and 35 are closed and the lined pipe is removed from the oven. These operations may be accomplished in any desirable sequence.

Should it be desirable to provide another layer of a different plastic, or a thicker layer of the same plastic, in the previously lined pipe, or when another pipe replaces pipe 31 for lining, the path of the powder through the pipe is preferably advantageously reversed. For example, when a second pipe is to be coated, it is mounted in identical manner to that of the previously coated pipe. The motor 18 is again activated. When the pipe reaches a sufficiently high temperature for lining, the bore 38 of valve 34 is moved into communication with ports 43 and 45 and a high velocity suction is applied through pipe 67 of separator 65. The passage means 62 of tube 59 associated with container 52 is opened to the passage of powder therethrough identically as hereinbefore described in connection with ball valve 63. The valve bore 39 is then moved into communication with ports 47 and 48 and powder particles from container 52 pass under high velocity through the pipe to be coated, through valve 34, tube 76 and into cyclone separator 65. The process steps during the coating operation and thereafter are repeated identically as hereinbefore described except that the passage of powder through the pipe is obviously in an opposite direction. Should it be desirable to apply alternate linings of different plastic materials to the pipe being coated, the valve 34 is provided with auxiliary tube 77 communicatable with ports 42 and 44 and valve 35 is provided with an auxiliary tube 81 communicatable with ports 48 and 49, whereby these auxiliary tubes are connectable with other containers of the type herein described and containing a different type plastic material.

While the process particularly described relates to the coating of a single pipe, it is apparent that a manifold means may be substituted for tubes 32 and 33 whereby a plurality of pipes, mounted in the oven 1 as described with respect to pipe 31, may be simultaneously lined.

FIGURE 4 illustrates modification of the invention in that the containers 51 and 52 are each substituted by a container 85 of the type employed for the provision of an aerated bed 86 of plastic particles, such as a truly fluidized bed of particles described in U.S. Patent No. 2,844,489, or otherwise for the provision of a bed of particles aerated to a mobile state of even aeration intermediate that of a truly fluidized bed and that of a bed in which the particles are in a loosely settled state, and such that the particles are rendered mobile by aeration as opposed to an inert or a merely loosely settled bed of particles such as bed 53 described above. Apart from the container 85, all other structural components of the system are identical to the system described with respect to FIGURES 1 through 3. The container 85 is provided with a bottom support 87 for the bed 86, the bottom being a porous filter composed of a fabric etc., as described with respect to filter 54 of FIGURE 1. The bottom of the container is enclosed by an air or gas chamber 88 having an inlet 89 formed through a wall thereof for the provision of pressurized air or gas into the chamber. In operation, and prior to the coating process, pressurized gas is introduced into the chamber 88 through inlet 89 and passed upwardly into the container through the filter 87, whereby the bed 86 is aerated under gas pressure either to the degree that the bed is fluidized to a truly fluidized condition, or to the degree that the bed particles are in a mobile state of even aeration intermediate that of a truly fluidized bed and that of a bed in which the particles are in a loosely settled state, depending on the gas pressure employed. Having provided an aerated bed of a type described above, the system is operated for coating or lining in the manner and by the method hereinabove described in connection with FIGURE 1.

FIGURE 5 illustrates another modification of the invention and comprises a container 90, powder bed 91, air chamber 93, filter 92 and inlet 94, all identical with corresponding structures described in connection with FIGURE 4. A funnel member 95 having a large opening 96, a smaller opening 97, and an elongated tube 98 extending axially from the smaller opening, is inserted into the container with the larger opening facing the filter 92. The large opening of the funnel is defined by a peripheral wall 99 having an overall diameter such that the outer surfaces of the wall are in contact with and vertically movable along the inner wall of the container. The combination of the funnel 95 and container 90 operates as a piston and cylinder. Vertically spaced abutment means or collars 100 and 101 are mounted on the inner wall of the tube 98. A tubular passage 102 communicates through the wall of the tube 98 between the spaced collars 100 and 101. A valve ball 103 is positioned in tube 98 between the collars 100 and 101 and is vertically movable therebetween and selectively seatable against the collars 100 and 101. A filling or loading conduit 104 communicates through the flared wall 105 of the hollow piston or funnel 95 at a location intermediate of the peripheral wall 99 and the smaller opening 97. Valve means 106 is provided in the conduit 104.

In operation, and prior to the coating process, the bed 91 is aerated in the manner described in connection with bed 86 of FIGURE 4.

Tube 75, illustrated in FIGURE 1, is connected to the tubular passage 102, and tube 71 of FIGURE 1 is connected to valve 106. Suction is applied to the system by means of conduit 68 of separator 66. In this modification of the invention it is not necessary to initially provide a high velocity suction. Valves 34 and 35 are activated in the manner hereinbefore described for the passage of powder along the course described in connection with FIGURE 1. At this stage only air or gas, under normal coating velocity passes through the system from the top of tube 98, through passage means 102, valve 34, etc., into separator 66. The hollow piston 95 is then depressed or rammed into the bed 91, whereupon powder particles are forced upwardly of pipe 98, the aerated powder urging the ball 103 against the collar or seat 101 to close the top of tube 98 against the entry of ambient air or gas through the top of the tube, and powder flows through the system initially under the high velocity provided by the ramming action and immediately subsequently at a decreased velocity provided by the suction. When the pipe 31 has had time to become lined with a sufficient layer of fused plastic as hereinbefore described and with the attendant variable rotation of pipe 31, the piston 95 is lifted from bed 91 and increased suction is applied to scour the pipe from excess unfused powder. The inertia of the lifting action, and the counter vacuum thereby created in the piston 95, moves ball 103 into engagement with collar 100 and opens the top of the tube 98 to the access of air for the scouring operation under the applied increased suction. Since the modification illustrated by FIGURE 5 merely substitutes for the containers 51 and 52 of FIGURE 1, the course taken by the powder follows that hereinbefore described and the coating and aftertreatment operations are similar to that described with respect to FIGURE 1.

FIGURE 6 illustrates another modification of the invention in that a container 107 is substituted for each of the containers 51 and 52 of FIGURE 1. Common numerical references in FIGURES 1 and 6 indicate identical structural components. Container 107 comprises a cylindrical container having mounted therein a gas pervious support 108 for powder bed 109. The support being a type support as herein described in connection with support 54 of FIGURE 1. The bottom of the container is enclosed by an air or gas chamber 110 having an inlet 111 formed through a wall thereof for the provision of pressurized air or gas in the chamber. A pressure gauge 112 communicates with the chamber 110 by means of gauge conduit 113 passing through a chamber wall. The container 107 has a flanged top 114 with a lid 115 covering the top thereof. A pressure gauge 116 communicates with the interior of the container above bed 109 by means of conduit 116 communicating through the lid. A gas or air pressure bleed valve communicates with the container interior through lid 115. The lid is provided with a powder loading port 118 formed therethrough and with conduit means 119, in which is mounted valve 120 communicating with the loading port. Tube 71 of separator 65 is connected to valve 120 for replenishing powder supply to the container from separator 65. A container gas inlet 121 is formed through lid 115. A valve 122 is provided for supplying pressurized gas to the container and through the system as hereinafter more particularly described. The valve 122 comprises a valve housing 123, rotatable core 124, a T-shaped core passage means 125, and valve ports 126, 127 and 128. A branched pressurized gas conduit 129 is connected to port 126 with the branching arms thereof each being connected one to the chamber gas inlet 111 and one to the container gas inlet 121. Port 127 of valve 122 is connected to port 44 of valve 34 by tube 130. Tube 131 is connected to port 41 and to a powder outlet means 132 passing through the wall of container 107 at a location between the top and bottom of bed 109. Tube 71 is connected to port 45 and to separator 65 as described with respect to FIGURE 1.

In operation pressurized air or gas having a pressure of, for example, 55 lbs./sq./in., passes through tube 133, valve 122, conduit 129 and simultaneously into gas chamber 110 through inlet 111 and the top of container 107 through inlet 121. The bleed valve 117 is adjusted to meter escape of pressurizing gas through the top of the container, the container being otherwise sealed against the egress of gas therefrom. For example, the bleed valve is adjusted to meter sufficient gas from the container above bed 109 so that about a five pound pressure differential exists between the chamber 110 and that portion of the container above bed 109. In such case the gas chamber gauge 112 indicates a pressure of 55 lbs./sq./in. and container gauge 116 indicates a pressure of about 50 lbs./sq./in., the pressure differential being sufficient to, in this case, fluidize the bed 109. However, various pressure differentials may be employed depending upon the degree of bed aeration desired. Having established the aerated bed, with a pipe 31 of FIGURE 1 having been readied for lining as hereinbefore described, the valves 34 and 35 are operated in the above described manner and powder particles under a resultant pressure of about 50 lbs./sq./in. passes outwardly of container 107, through valve 34, tube 32, pipe 31, valve 35 and into cyclone separator 66. Pipe 31 is thereby substantially instantaneously filled with powder and rotated in the manner above set forth for the lining of the hot pipe while the powder flows therethrough. In order to maintain the powder flowing through the pipe in a fluidized condition, suction is applied to the system through separator conduit 68, whereby the unfused powder passes through the pipe in the coating operation under both gas pressure and suction. Having maintained flowing powder in the pipe for a sufficient time to provide an adequate fused lining, the valve 34 is operated to close communication between ports 41 and 42 and to open communication between ports 44 and 42, whereby pressurized gas flows from valve 122, through conduit 130, valve 34 and through the pipe in a scouring action to remove excess unfused powder from the pipe. Having scoured the pipe 31, the valve 34 is completely closed and the pipe is given an aftertreatment under increased speed of rotation as herinbefore described.

While the invention is particularly described and illustrated with the lining of pipes, it is also contemplated to externally coat articles by positioning the articles in a pipe or tube in the apparatus herein described, except that, in such case, the high speed rotation of the pipe is preferably not employed.

Various modifications of the invention are contemplated within the scope of the appended claims.

What is claimed is:

1. Apparatus for lining a heated tubular member comprising a container for a bed of fusible particles, rotatable means, a means to support a heated tubular member on the rotatable means, first conduit means for passing the particles from the container into one end of the tubular member, second conduit means connectable to the other end of the tubular member for withdrawing excess particles therefrom, separator means connected to said second conduit means, suction means operatively associated with said separator means for moving the particles through said heated tubular member, and means for rotating the rotatable means.

2. Apparatus for lining a tubular member comprising a container for a bed of fusible particles, an elongated oven, rotatable means mounted in the oven, a means to support a tubular member on the rotatable means longitudinally in the oven, first conduit means for passing the particles from the container into one end of the tubular member, second conduit means connectable to the other end of the tubular member for withdrawing excess particles therefrom, separator means connected to said second conduit means, suction means operatively associated with said separator means for moving the particles through said tubular member, and means for rotating the rotatable means.

3. Apparatus according to claim 2, comprising valve means in the first conduit means and valve means in the second conduit means.

4. Apparatus according to claim 2, wherein the rotating means is a variable speed means.

5. Apparatus for lining a tubular member comprising a container for a bed of fusible particles, an elongated oven, rotatable means mounted in the oven, a means to support a tubular member on the rotatable means longitudinally in the oven, first conduit means for passing the particles from the container into one end of the tubular member, second conduit means connectable to the other end of the tubular member for withdrawing excess particles therefrom, separator means connected to said second conduit means, suction means operatively associated with said separator means for moving the particles through said tubular member, means for rotating the rotatable means, the container comprising a gas pervious bed support internally thereof, the bottom of the container being open to ambient atmosphere, a funnel member having a large opening and a smaller opening and mounted in the container, the large opening facing the bed support, a tube member extending axially outwardly of the smaller opening, valve means in said tube member, an opening in the tube member wall communicating with the valve means, and the first conduit means communicating with said tube opening.

6. Apparatus for lining a tubular member comprising a plurality of containers each as a container for a bed of fusible particles, an elongated oven, rotatable means mounted in and longitudinally of the oven, a means to support a tubular member on the rotatable means longitudinally in the oven, means for withdrawing particles from a bed of particles in one of the containers, first conduit means for passing the withdrawn particles into the tubular member, a first separator means, second conduit means for passing excess particles from the tubular member to the first separator means, means for rotating the rotatable means, a second separator means, and means for reversing the flow of particles through the tubular member from another container through the second and first conduits to the second separator means.

7. Apparatus for coating materials comprising a container for a bed of fusible particles, the container comprising a gas pervious bed support internally thereof, an air chamber mounted on the bottom of the container and enclosing the support, means for admitting pressurized gas to the air chamber, a funnel-like hollow piston mounted in the chamber, the piston having a flared end portion with a large opening therein defined by piston walls slidably engageable with the inner surface of the container, a smaller opening centrally of the flared portion, tube means extending axially outwardly and upwardly of the smaller opening, the large opening facing the support, valve means inside the tube means, a conduit formed through the wall of the tube in communication with the valve means, and means for motivating the piston.

8. Apparatus for coating materials comprising a container for a bed of fusible particles, the container comprising a gas pervious bed support internally thereof, an air chamber mounted on the bottom of the container and enclosing the support, means for admitting pressurized gas to the air chamber, a lid covering the top of the container, means for admitting pressurized gas to an upper internal portion of the container, means for simultaneously admitting pressurized gas to the upper portion of the container and to the gas chamber, meter means for metering gas pressure from the top of the container to provide a pressure differential between the gas chamber and the upper internal portion of the container, means for expelling particles from the container while maintaining the said pressure differential.

9. A method of lining a tubular member comprising forming an aerated bed of particles in a container applying suction to a hollow piston mounted in the container, ramming the piston into the aerated bed and thereby passing the particles at high velocity through the piston and therefrom through a heated rotating tubular member and into a separator means, thereafter withdrawing particles from the bed through the piston and excess particles through the tubular member by suction applied through said separator means, increasing the rotational speed of the tubular member until a suitable fused lining is formed on the tubular member, withdrawing the piston from the bed and thereby terminating the passage of particles from the bed, air scouring the tubular member of excess unfused particles, terminating the scouring of the tubular member, continuing rotation of the tubular member under substantially high speed rotation until a smoothened lining is formed on the tubular member, and subsequently terminating the rotation thereof.

10. A method according to claim 9, wherein the bed is aerated to a fluidized condition.

11. A method according to claim 9, wherein the bed is aerated to a mobile state of even aeration intermediate that of a truly fluidized bed and that of a bed in which the particles are in a loosely settled state.

12. A method of lining a tubular member comprising forming a bed of fusible particles in a container, withdrawing particles from the bed and passing the particles through a heated rotating tubular member and into a separator means by moving the particles to substantially fill the tubular member and to pass the excess particles into the separator by means of suction applied through said separator means until a suitable fused lining is formed on the tubular member, terminating the passage of particles from the bed and air scouring the tubular member of excess unfused particles, terminating the scouring of the tubular member, maintaining rotation until a substantially smooth lining is formed on the tubular member, and subsequently terminating the rotation thereof.

References Cited by the Examiner

UNITED STATES PATENTS

| | | | |
|---|---|---|---|
| 1,997,761 | 4/35 | Bailey et al. | |
| 2,626,011 | 1/53 | Campbell | 118—309 |
| 2,632,205 | 3/53 | Harris | 117—18 X |
| 2,734,782 | 2/56 | Galle | 302—53 |
| 2,758,564 | 8/56 | Randall. | |
| 2,880,109 | 3/59 | Current et al. | 117—18 X |
| 2,919,160 | 12/59 | Blackburn. | |
| 3,099,493 | 7/63 | De Hart et al. | 118—429 |
| 3,108,022 | 10/63 | Church | 117—21 X |

OTHER REFERENCES

Gemmer: "Das Wirbilsintern-Entwicklungen und neuere Erkenntnesse," Kunststoffer Bd. 47, 1957, Heft 8, pp. 74–76 relied upon.

Checkel: Fluidized Polymer Deposition, Modern Plastics, October 1958, pp. 125–132 relied upon.

"Das Wirbelsintervenfahren Plastverarbeites," September 1956, Original, pp. 342–348, translation 20 pages.

WILLIAM D. MARTIN, *Primary Examiner.*

RICHARD D. NEVIUS, *Examiner.*